(12) United States Patent
Raghavan et al.

(10) Patent No.: US 12,088,371 B2
(45) Date of Patent: Sep. 10, 2024

(54) SELECTION OF BEAMFORMING CONFIGURATION PARAMETERS FOR A MULTI-PANEL ACTIVE ANTENNA SYSTEM (AAS)

(71) Applicant: QUALCOMM Incorporated, San Diego, CA (US)

(72) Inventors: Vasanthan Raghavan, West Windsor Township, NJ (US); Mustafa Emara, Munich (DE); Marco Papaleo, Bologna (IT); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 17/650,970

(22) Filed: Feb. 14, 2022

(65) Prior Publication Data

US 2023/0261706 A1    Aug. 17, 2023

(51) Int. Cl.
*H04W 16/28*    (2009.01)
*H04B 7/0456*    (2017.01)

(52) U.S. Cl.
CPC .......... *H04B 7/0469* (2013.01); *H04W 16/28* (2013.01)

(58) Field of Classification Search
CPC ............................. H04B 7/0469; H04W 16/28
See application file for complete search history.

(56) References Cited

U.S. PATENT DOCUMENTS

| | | | | |
|---|---|---|---|---|
| 6,657,698 B1 * | 12/2003 | Greene | ............... | G02F 1/13336 349/73 |
| 6,703,970 B2 * | 3/2004 | Gayrard | ............... | H01Q 21/061 342/383 |
| 7,595,762 B2 * | 9/2009 | Mansour | ............... | H01Q 1/3283 343/882 |

(Continued)

FOREIGN PATENT DOCUMENTS

WO    WO-2021209792 A1 * 10/2021    ........... H04B 7/0617

OTHER PUBLICATIONS

Amani N., et al., "Multi-Panel Sparse Base Station Design With Physical Antenna Effects in Massive MU-MIMO", IEEE Transactions on Vehicular Technology, IEEE, USA, vol. 69, No. 6, Apr. 19, 2020, pp. 6500-6510, XP011793354, ISSN: 0018-9545, DOI: 10.1109/TVT.2020.2988612 [retrieved on Jun. 17, 2020], The whole document.

(Continued)

*Primary Examiner* — Hai V Nguyen
(74) *Attorney, Agent, or Firm* — Paul M. McAdams; Harrity & Harrity, LLP

(57) ABSTRACT

Various aspects of the present disclosure generally relate to wireless communication. In some aspects, a wireless device may receive interference information. The wireless device may select, based at least in part on the interference information, beamforming configuration parameters that include: a quantity of one or more transceiver units that are each associated with a panel of a multi-panel active antenna system, a steering tilt angle to use for each panel controlled (Continued)

by a transceiver unit, and a steering subtilt angle for use across the panels. The wireless device may communicate with another device using the beamforming configuration parameters. Numerous other aspects are described.

30 Claims, 10 Drawing Sheets

(56) References Cited

U.S. PATENT DOCUMENTS

| | | | |
|---|---|---|---|
| 7,705,793 B2* | 4/2010 | Kaplan | H01Q 3/2605 343/878 |
| 7,911,400 B2* | 3/2011 | Kaplan | H01Q 3/26 343/713 |
| 8,447,236 B2* | 5/2013 | Gorokhov | H04L 25/03343 455/501 |
| 8,686,896 B2* | 4/2014 | Schuman | G01S 7/4026 342/368 |
| 9,100,146 B2* | 8/2015 | Lee | H04W 16/28 |
| 9,300,501 B2* | 3/2016 | Jindal | H04W 72/21 |
| 9,590,709 B2* | 3/2017 | Thomas | H01Q 3/30 |
| 9,621,850 B1* | 4/2017 | Mitchell | H04B 7/18508 |
| 9,629,000 B2* | 4/2017 | Thomas | H04B 7/0617 |
| 10,897,303 B1* | 1/2021 | Ananth | H04B 7/18504 |
| 11,159,255 B2* | 10/2021 | Garcia | H04B 17/0085 |
| 11,159,347 B2* | 10/2021 | Ahn | H04L 25/0224 |
| 11,296,408 B1* | 4/2022 | Bondyopadhyay | H01Q 21/0006 |
| 11,368,211 B1* | 6/2022 | Boyapati | H04B 7/0617 |
| 11,431,103 B2* | 8/2022 | Baligh | H01Q 21/0018 |
| 11,456,823 B2* | 9/2022 | Ryu | H04W 76/14 |
| 11,483,060 B2* | 10/2022 | Chaves | H04B 7/088 |
| 11,588,523 B2* | 2/2023 | Khoshnevisan | H04L 5/0091 |
| 11,606,773 B1* | 3/2023 | Maher | H04W 64/006 |
| 11,658,697 B2* | 5/2023 | Tsui | H04W 72/23 370/329 |
| 11,700,056 B2* | 7/2023 | Fang | H01Q 1/42 370/317 |
| 11,722,188 B1* | 8/2023 | Sen | H04B 7/0456 375/267 |
| 11,762,051 B2* | 9/2023 | Moon | H04B 7/0695 342/359 |
| 11,903,766 B2* | 2/2024 | Loype | A61B 8/4466 |
| 11,953,617 B2* | 4/2024 | Teague | G01S 13/90 |
| 2003/0043068 A1* | 3/2003 | Gayrard | H01Q 21/061 342/354 |
| 2006/0176843 A1* | 8/2006 | Gat | H04B 7/18523 370/316 |
| 2006/0284775 A1* | 12/2006 | Kaplan | H01Q 21/065 343/713 |
| 2007/0146222 A1* | 6/2007 | Mansour | H01Q 3/08 343/765 |
| 2008/0018545 A1* | 1/2008 | Kaplan | H01Q 1/3275 343/713 |
| 2009/0286482 A1* | 11/2009 | Gorokhov | H04B 7/0617 455/63.1 |
| 2010/0164817 A1* | 7/2010 | Kaplan | H01Q 21/061 343/713 |
| 2011/0215985 A1* | 9/2011 | Kaplan | H01Q 21/08 343/879 |
| 2012/0206291 A1* | 8/2012 | Schuman | H01Q 3/242 342/174 |
| 2013/0127845 A1* | 5/2013 | Schauf | G01S 7/52087 345/419 |
| 2013/0162476 A1* | 6/2013 | Thomas | H01Q 3/30 342/372 |
| 2013/0194890 A1* | 8/2013 | Schauf | A61B 8/463 367/7 |
| 2013/0235807 A1* | 9/2013 | Lee | H01Q 1/246 370/329 |
| 2014/0085143 A1* | 3/2014 | Chang | H01Q 1/28 342/371 |
| 2014/0218258 A1* | 8/2014 | Walker | H01Q 1/007 343/848 |
| 2015/0180561 A1* | 6/2015 | Jindal | H04B 7/0413 375/267 |
| 2015/0333894 A1* | 11/2015 | Wang | H04B 7/0452 370/329 |
| 2016/0043473 A1* | 2/2016 | Walker | H01Q 1/38 29/601 |
| 2016/0127920 A1* | 5/2016 | Thomas | H04B 7/0617 455/446 |
| 2017/0007207 A1* | 1/2017 | Gauthier | A61B 8/481 |
| 2018/0049150 A1* | 2/2018 | Chandwani | H04W 76/10 |
| 2018/0123674 A1* | 5/2018 | Freedman | H04B 7/18513 |
| 2018/0227928 A1* | 8/2018 | Kim | H04L 5/0023 |
| 2018/0269957 A1* | 9/2018 | Graham, III | H04B 7/15 |
| 2018/0278320 A1* | 9/2018 | Chendamarai Kannan | H04B 7/082 |
| 2018/0302238 A1* | 10/2018 | Graham, III | H04L 9/14 |
| 2018/0331727 A1* | 11/2018 | John Wilson | H04W 72/046 |
| 2018/0337725 A1* | 11/2018 | Stephenne | H04B 7/2603 |
| 2019/0074954 A1* | 3/2019 | Sevilla R. | H04B 7/04 |
| 2019/0104477 A1* | 4/2019 | MolavianJazi | H04W 72/23 |
| 2019/0115975 A1* | 4/2019 | Freedman | H01Q 15/16 |
| 2019/0372656 A1* | 12/2019 | Fang | H01Q 3/26 |
| 2020/0280377 A1* | 9/2020 | Haustein | H04B 17/20 |
| 2020/0358182 A1* | 11/2020 | Klemmer | H01Q 3/26 |
| 2020/0412490 A1* | 12/2020 | Ryu | H04L 1/1819 |
| 2021/0200028 A1* | 7/2021 | Zhang | H01L 25/0753 |
| 2021/0226680 A1* | 7/2021 | Khoshnevisan | H04L 5/0048 |
| 2021/0273714 A1* | 9/2021 | Lee | H04W 56/001 |
| 2021/0331701 A1* | 10/2021 | Hur | H04W 4/44 |
| 2022/0021125 A1* | 1/2022 | Baligh | H01Q 21/06 |
| 2022/0029696 A1* | 1/2022 | Chaves | H04B 7/18504 |
| 2022/0045433 A1* | 2/2022 | Bhattacharyya | H01Q 5/35 |
| 2022/0078784 A1* | 3/2022 | Yajnanarayana | H04W 24/02 |
| 2022/0107381 A1* | 4/2022 | Moon | G01S 3/60 |
| 2022/0120847 A1* | 4/2022 | Zhang | G01S 7/032 |
| 2022/0287681 A1* | 9/2022 | Joseph | A61B 8/4427 |
| 2022/0304660 A1* | 9/2022 | Loype | A61B 8/54 |
| 2022/0308165 A1* | 9/2022 | Teague | G01S 13/872 |
| 2022/0321185 A1* | 10/2022 | Pepin | H04B 17/11 |
| 2022/0329295 A1* | 10/2022 | Park | H04L 5/005 |
| 2022/0346103 A1* | 10/2022 | Dutta | H04W 72/046 |
| 2023/0009046 A1* | 1/2023 | Hill | H01Q 1/06 |
| 2023/0015187 A1* | 1/2023 | Mo | H04B 7/0695 |
| 2023/0031214 A1* | 2/2023 | Gianinni | H01Q 1/42 |
| 2023/0057661 A1* | 2/2023 | Awoniyi-Oteri | H04W 24/08 |
| 2023/0106320 A1* | 4/2023 | Haustein | H04B 17/0085 455/67.14 |
| 2023/0131254 A1* | 4/2023 | Karakkad Kesavan Namboodiri | H04B 7/0695 370/252 |
| 2023/0139135 A1* | 5/2023 | Soulhi | H04L 43/16 370/254 |
| 2023/0148995 A1* | 5/2023 | Neben | A61B 8/00 600/437 |
| 2023/0170962 A1* | 6/2023 | Ali | H04B 7/15542 370/252 |
| 2023/0180252 A1* | 6/2023 | Khoshnevisan | H04L 1/189 370/329 |
| 2023/0181160 A1* | 6/2023 | Chiang | A61B 8/461 600/444 |
| 2023/0189315 A1* | 6/2023 | Haustein | H04W 24/02 370/252 |
| 2023/0217265 A1* | 7/2023 | Huang | H04B 7/0617 370/329 |
| 2024/0057971 A1* | 2/2024 | Chiang | A61B 8/462 |

OTHER PUBLICATIONS

International Search Report and Written Opinion—PCT/US2023/062384—ISA/EPO—Jul. 11, 2023.

* cited by examiner

SELECTION OF BEAMFORMING CONFIGURATION PARAMETERS FOR A MULTI-PANEL ACTIVE ANTENNA SYSTEM (AAS)

FIELD OF THE DISCLOSURE

Aspects of the present disclosure generally relate to wireless communication and to techniques and apparatuses for selecting configuration parameters for a multi-panel active antenna system.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a wireless device. The method may include receiving interference information and selecting, based at least in part on the interference information, beamforming configuration parameters that include a quantity of one or more transceiver units that are each associated with a panel of a multi-panel active antenna system (AAS), a steering tilt angle to use for each panel controlled by a transceiver unit, and a steering subtilt angle for use across the panels. The method may include communicating with another device using the beamforming configuration parameters.

Some aspects described herein relate to a wireless device for wireless communication. The wireless device may include a memory and one or more processors coupled to the memory. The one or more processors may be configured to receive interference information and select, based at least in part on the interference information, beamforming configuration parameters that include a quantity of one or more transceiver units that are each associated with a panel of a multi-panel AAS, a steering tilt angle to use for each panel controlled by a transceiver unit, and a steering subtilt angle for use across the panels. The one or more processors may be configured to communicate with another device using the beamforming configuration parameters.

Some aspects described herein relate to a non-transitory computer-readable medium that stores a set of instructions for wireless communication by a wireless device. The set of instructions, when executed by one or more processors of the wireless device, may cause the wireless device to receive interference information and select, based at least in part on the interference information, beamforming configuration parameters that include a quantity of one or more transceiver units that are each associated with a panel of a multi-panel AAS, a steering tilt angle to use for each panel controlled by a transceiver unit, and a steering subtilt angle for use across the panels. The set of instructions, when executed by one or more processors of the wireless device, may cause the wireless device to communicate with another device using the beamforming configuration parameters.

Some aspects described herein relate to an apparatus for wireless communication. The apparatus may include means for receiving interference information and means for selecting, based at least in part on the interference information, beamforming configuration parameters that include a quantity of one or more transceiver units that are each associated with a panel of a multi-panel AAS, a steering tilt angle to use for each panel controlled by a transceiver unit, and a steering subtilt angle for use across the panels. The apparatus may include means for communicating with another device using the beamforming configuration parameters.

Aspects generally include a method, apparatus, system, computer program product, non-transitory computer-readable medium, user equipment, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
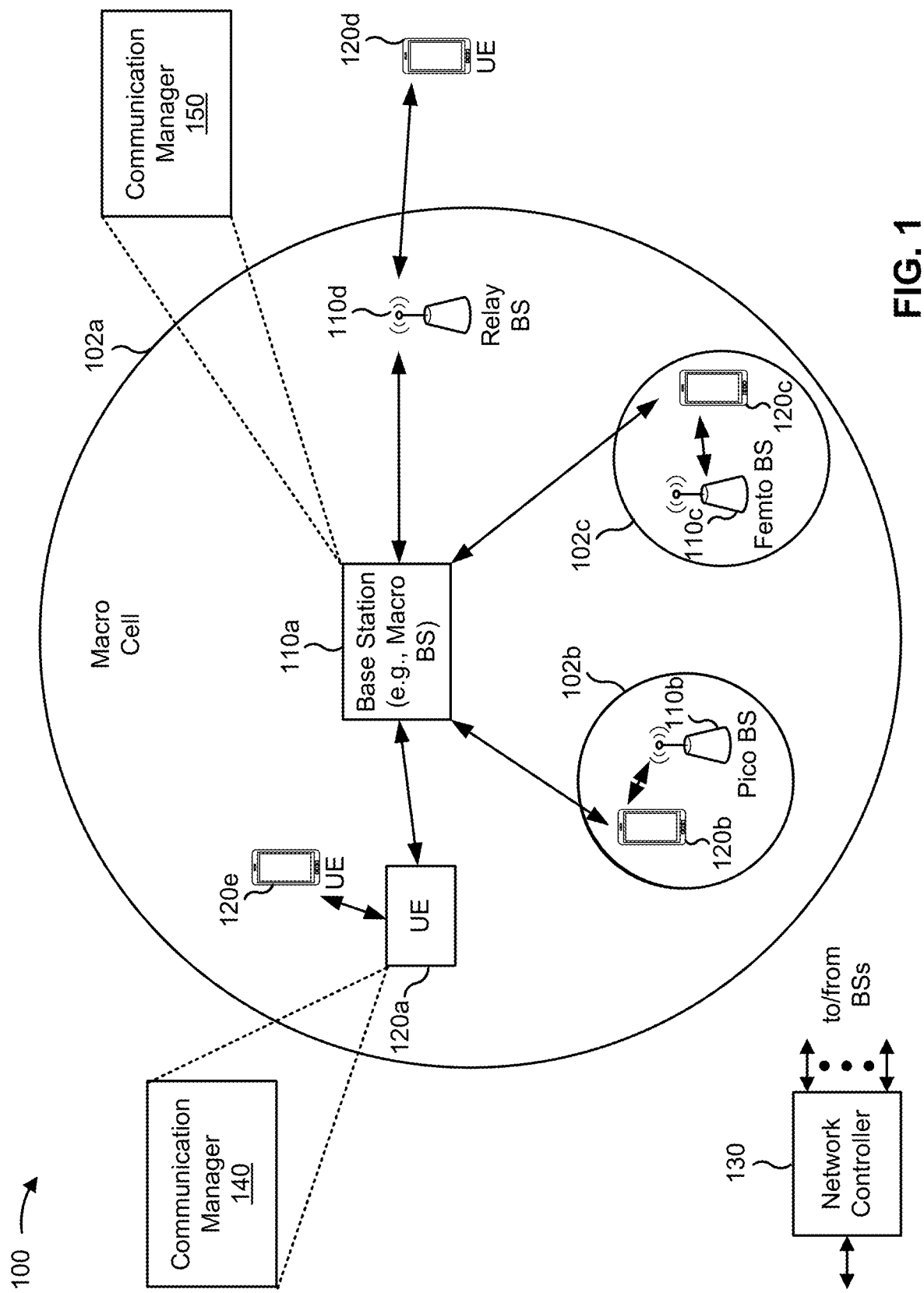
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include a user equipment (UE) 120 or multiple UEs 120 (shown as a UE 120*a*, a UE 120*b*, a UE 120*c*, a UE 120*d*, and a UE 120*e*). The wireless network 100 may also include one or more network entities, such as base stations 110 (shown as a BS 110*a*, a BS 110*b*, a BS 110*c*, and a BS 110*d*), and/or other network entities. A base station 110 is a network entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network entities in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is a network entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network with network entities that include different types of BSs, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set network entities and may provide coordination and control for these network entities. The network controller 130 may communicate with the base stations 110 via a backhaul communication link. The network entities may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network entity as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a wireless device (e.g., a UE 120, network entity) may include a communication manager 140 or 150. As described in more detail elsewhere herein, the communication manager 140 or 150 may receive interference information and select, based at least in part on the interference information, beamforming configuration parameters that include: a quantity of one or more transceiver units that are each associated with a panel of a multi-panel active antenna system (AAS), a steering tilt angle to use for each panel controlled by a transceiver unit, and a steering subtilt angle for use across the panels. The communication manager 140 or 150 may communicate with another device using the beamforming configuration parameters. Additionally, or alternatively, the communication manager 140 or 150 may perform one or more other operations described herein.

As indicated above, FIG. 1 is provided as an example. Other examples may differ from what is described with regard to FIG. 1.

Figure 2:
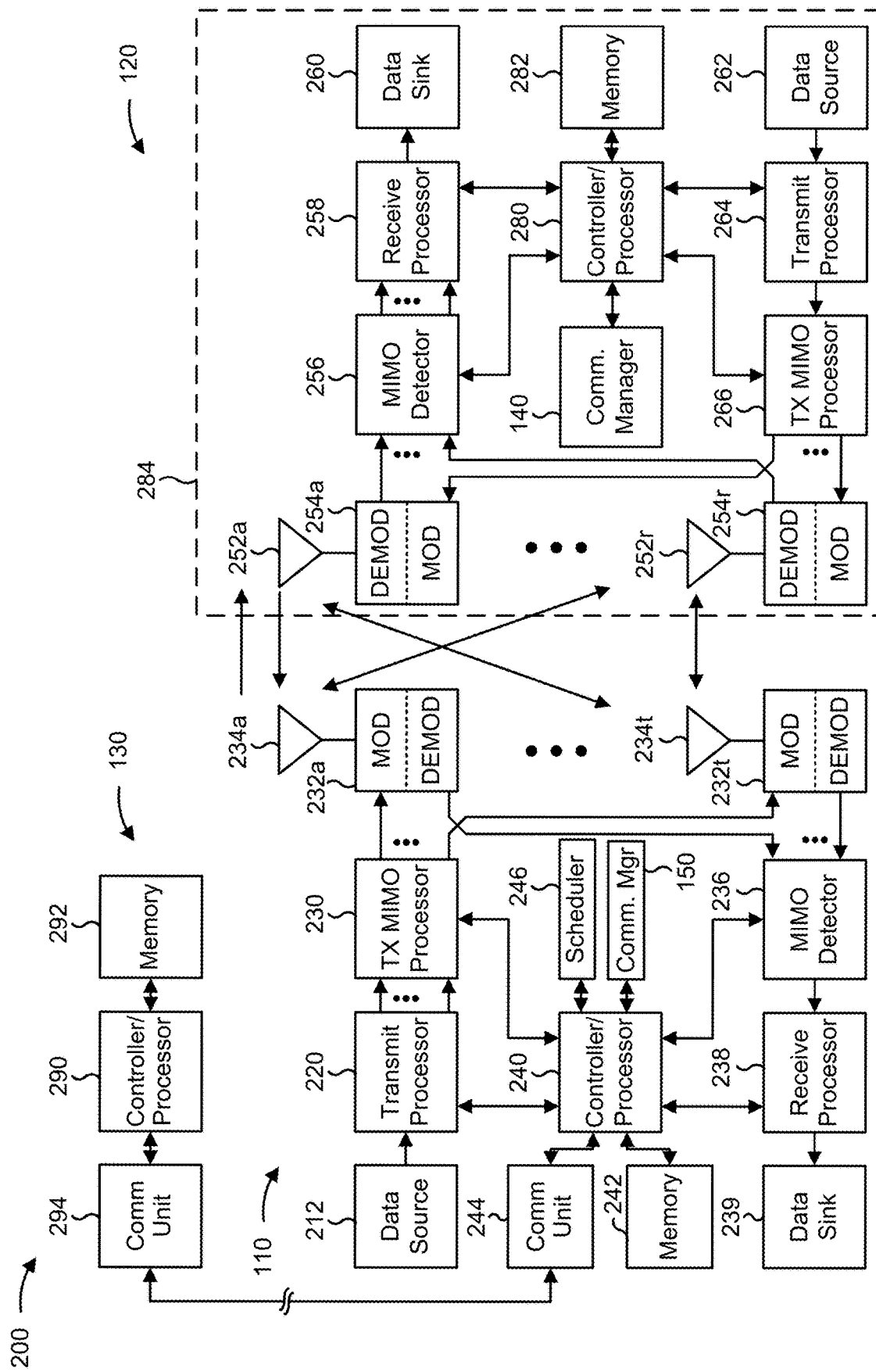
FIG. 2 is a diagram illustrating an example of a network entity in communication with a user equipment (UE) in a wireless network, in accordance with the present disclosure.

FIG. 2 is a diagram illustrating an example 200 of a network entity (e.g., base station 110) in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the network entity (e.g., base station 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

A controller/processor of a network entity, (e.g., the controller/processor 240 of the base station 110), the controller/processor 280 of the UE 120, and/or any other component(s) of FIG. 2 may perform one or more techniques associated with selecting beamforming configuration parameters for a multi-panel AAS, as described in more detail elsewhere herein. In some aspects, the wireless device described herein is included in the UE 120, or includes one or more of the UE 120 shown in FIG. 2. In some aspects, the wireless device described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 900 of FIG. 9 and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 900 of FIG. 9 and/or other processes as described herein. In some examples, executing instructions may include running the instructions, converting the instructions, compiling the instructions, and/or interpreting the instructions, among other examples.

In some aspects, a wireless device (e.g., a UE 120, network entity) includes means for receiving interference information; means for selecting, based at least in part on the interference information, beamforming configuration parameters that include: a quantity of one or more transceiver units that are each associated with a panel of a multi-panel AAS, a steering tilt angle to use for each panel controlled by a transceiver unit, and a steering subtilt angle for use across the panels; and/or means for communicating with another device using the beamforming configuration parameters. In some aspects, the means for the wireless device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the wireless device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
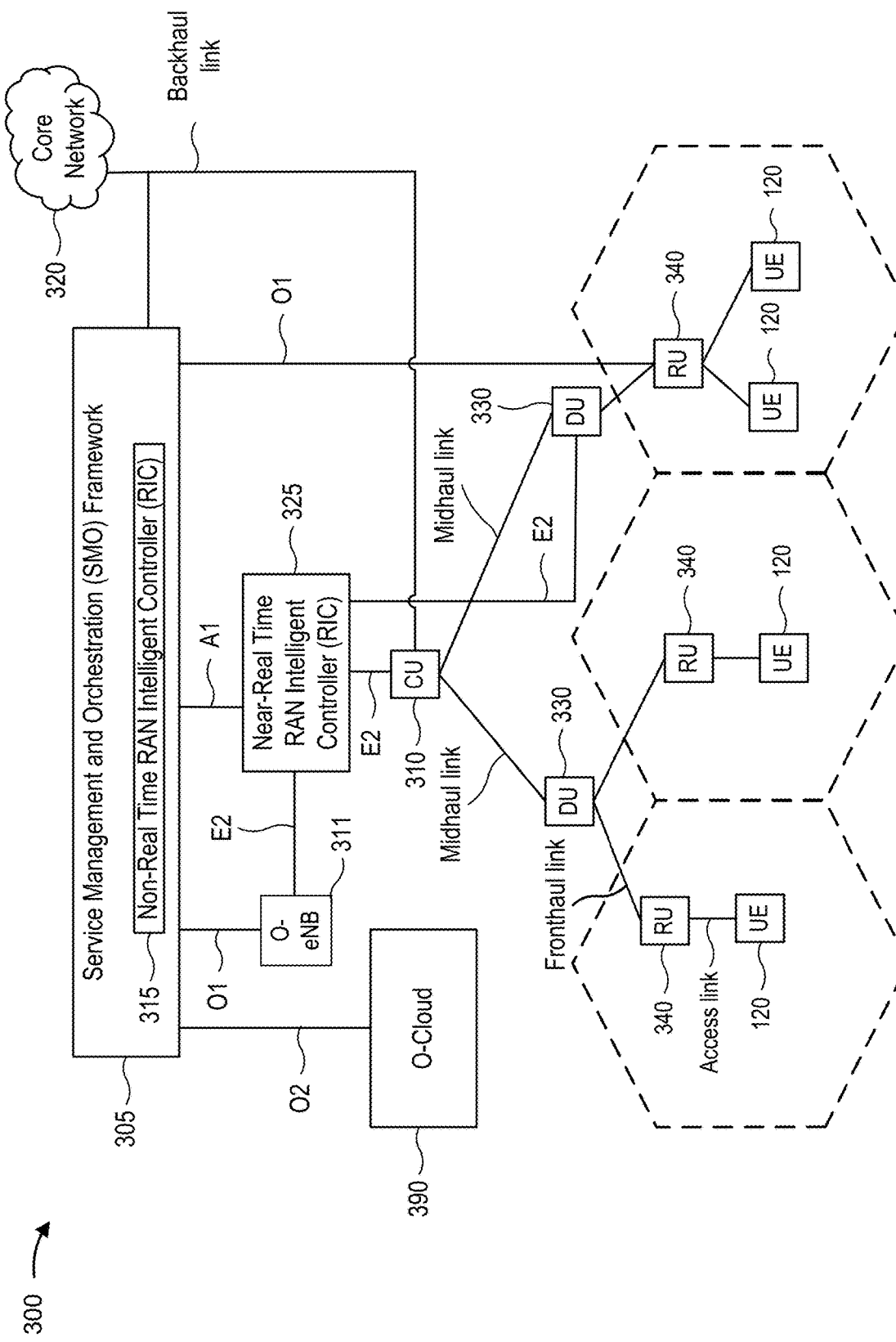
FIG. 3 is a diagram illustrating an example of a disaggregated base station, in accordance with the present disclosure.

FIG. 3 is a diagram illustrating an example of a disaggregated base station 300, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The fronthaul link, the midhaul link, and the backhaul link may be generally referred to as "communication links." The RUs 340 may communicate with respective UEs 120 via one or more RF access links. In some aspects, the UE 120 may be simultaneously served by multiple RUs 340. The DUs 330 and the RUs 340 may also be referred to as "O-RAN DUs (O-DUs)" and "O-RAN RUs (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit—User Plane (CU-UP)), control plane functionality (i.e., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT MC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

As indicated above, FIG. 3 is provided as an example. Other examples may differ from what is described with regard to FIG. 3.

Figure 4:
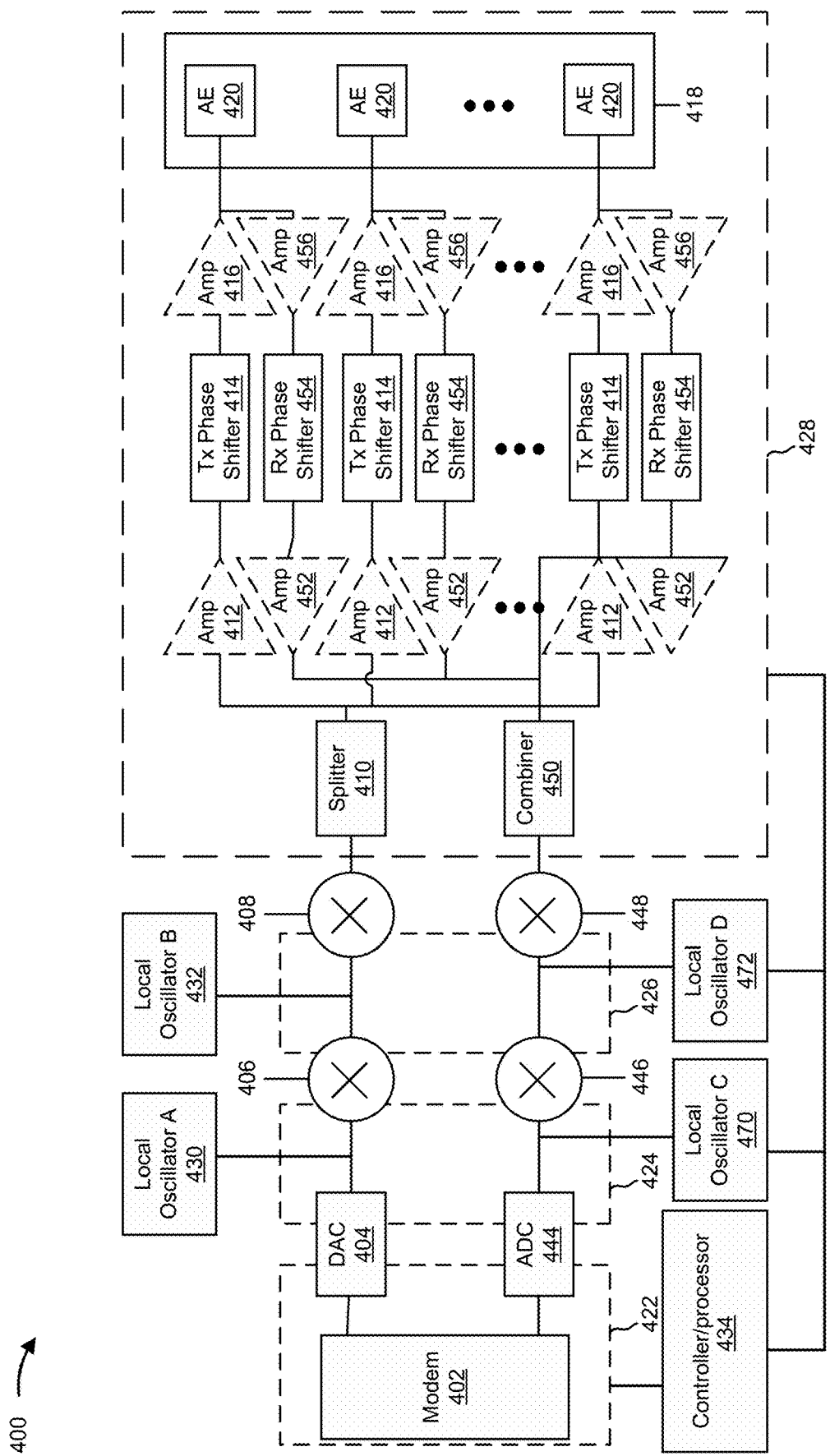
FIG. 4 is a diagram illustrating an example beamforming architecture that supports beamforming for millimeter wave communications, in accordance with the present disclosure.

FIG. 4 is a diagram illustrating an example beamforming architecture 400 that supports beamforming for millimeter wave (mmW) communications, in accordance with the present disclosure. In some aspects, architecture 400 may implement aspects of wireless network 100. In some aspects, architecture 400 may be implemented in a transmitting device (e.g., a first wireless communication device, UE, or base station) and/or a receiving device (e.g., a second wireless communication device, UE, or base station), as described herein.

Broadly, FIG. 4 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 400 includes a modem (modulator/demodulator) 402, a digital to analog converter (DAC) 404, a first mixer 406, a second mixer 408, and a splitter 410. The architecture 400 also includes multiple first amplifiers 412, multiple phase shifters 414, multiple second amplifiers 416, and an antenna array 418 that includes multiple antenna elements 420. In some examples, the modem 402 may be one or more of the modems 232 or modems 254 described in connection with FIG. 2.

Transmission lines or other waveguides, wires, and/or traces are shown connecting the various components to illustrate how signals to be transmitted may travel between components. Reference numbers 422, 424, 426, and 428 indicate regions in the architecture 400 in which different types of signals travel or are processed. Specifically, reference number 422 indicates a region in which digital baseband signals travel or are processed, reference number 424 indicates a region in which analog baseband signals travel or are processed, reference number 426 indicates a region in which analog intermediate frequency (IF) signals travel or are processed, and reference number 428 indicates a region in which analog radio frequency (RF) signals travel or are processed. The architecture also includes a local oscillator A 430, a local oscillator B 432, and a controller/processor 434. In some aspects, controller/processor 434 corresponds to controller/processor 240 of the base station described above in connection with FIG. 2 and/or controller/processor 280 of the UE described above in connection with FIG. 2.

Each antenna array 420 may include one or more constituent parts (made of antenna elements) for radiating (transmitting or receiving) RF signals. For example, a single antenna array 420 may include a first sub-element cross-polarized with a second sub-element that can be used to independently transmit cross-polarized signals. The antenna array 420 may include patch antennas, dipole antennas, or other types of antennas arranged in a linear pattern, a two dimensional/planar pattern, or another pattern. A spacing between antenna elements in the array 420 may be such that signals with a desired wavelength transmitted separately by the antenna elements may interact or interfere (e.g., to form a desired beam). For example, given an expected range of wavelengths or frequencies, the spacing may provide a quarter wavelength, a half wavelength, or other fraction of a wavelength of spacing between neighboring antenna elements 420 to allow for interaction or interference of signals transmitted by the separate antenna elements 420 within that expected range.

The modem 402 processes and generates digital baseband signals and may also control operation of the DAC 404, first and second mixers 406, 408, splitter 410, first amplifiers 412, phase shifters 414, and/or the second amplifiers 416 to transmit signals via one or more or all of the antenna elements 420. The modem 402 may process signals and control operation in accordance with a communication standard such as a wireless standard discussed herein. The DAC 404 may convert digital baseband signals received from the modem 402 (and that are to be transmitted) into analog baseband signals. The first mixer 406 upconverts analog baseband signals to analog IF signals within an IF using a local oscillator A 430. For example, the first mixer 406 may mix the signals with an oscillating signal generated by the local oscillator A 430 to "move" the baseband analog signals to the IF. In some cases, some processing or filtering (not shown) may take place at the IF. The second mixer 408 upconverts the analog IF signals to analog RF signals using the local oscillator B 432. Similar to the first mixer, the second mixer 408 may mix the signals with an oscillating signal generated by the local oscillator B 432 to "move" the IF analog signals to the RF or the frequency at which signals will be transmitted or received. The modem 402 and/or the controller/processor 434 may adjust the frequency of local oscillator A 430 and/or the local oscillator B 432 so that a desired IF and/or RF frequency is produced and used to facilitate processing and transmission of a signal within a desired bandwidth.

In the illustrated architecture 400, signals upconverted by the second mixer 408 are split or duplicated into multiple signals by the splitter 410. The splitter 410 in architecture 400 splits the RF signal into multiple identical or nearly identical RF signals. In other examples, the split may take place with any type of signal, including with baseband digital, baseband analog, or IF analog signals. Each of these signals may correspond to an antenna element 420, and the signal travels through and is processed by amplifiers 412, 416, phase shifters 414, and/or other elements corresponding to the respective antenna element 420 to be provided to and transmitted by the corresponding antenna element 420 of the antenna array 418. In one example, the splitter 410 may be an active splitter that is connected to a power supply and provides some gain so that RF signals exiting the splitter 410 are at a power level equal to or greater than the signal entering the splitter 410. In another example, the splitter 410 is a passive splitter that is not connected to power supply and the RF signals exiting the splitter 410 may be at a power level lower than the RF signal entering the splitter 410.

After being split by the splitter 410, the resulting RF signals may enter an amplifier, such as a first amplifier 412, or a phase shifter 414 corresponding to an antenna element 420. The first and second amplifiers 412, 416 are illustrated with dashed lines because one or both of them might not be necessary in some aspects. In some aspects, both the first amplifier 412 and second amplifier 416 are present. In some aspects, neither the first amplifier 412 nor the second amplifier 416 is present. In some aspects, one of the two amplifiers 412, 416 is present but not the other. By way of example, if the splitter 410 is an active splitter, the first amplifier 412 may not be used. By way of further example, if the phase shifter 414 is an active phase shifter that can provide a gain, the second amplifier 416 might not be used.

The amplifiers 412, 416 may provide a desired level of positive or negative gain. A positive gain (positive dB) may be used to increase an amplitude of a signal for radiation by a specific antenna element 420. A negative gain (negative dB) may be used to decrease an amplitude and/or suppress radiation of the signal by a specific antenna element. Each of the amplifiers 412, 416 may be controlled independently (e.g., by the modem 402 or the controller/processor 434) to provide independent control of the gain for each antenna element 420. For example, the modem 402 and/or the controller/processor 434 may have at least one control line connected to each of the splitter 410, first amplifiers 412, phase shifters 414, and/or second amplifiers 416 that may be used to configure a gain to provide a desired amount of gain for each component and thus each antenna element 420.

The phase shifter 414 may provide a configurable phase shift or phase offset to a corresponding RF signal to be transmitted. The phase shifter 414 may be a passive phase shifter not directly connected to a power supply. Passive phase shifters might introduce some insertion loss. The second amplifier 416 may boost the signal to compensate for the insertion loss. The phase shifter 414 may be an active phase shifter connected to a power supply such that the active phase shifter provides some amount of gain or prevents insertion loss. The settings of each of the phase shifters 414 are independent, meaning that each can be independently set to provide a desired amount of phase shift or the same amount of phase shift or some other configuration. The modem 402 and/or the controller/processor 434 may have at least one control line connected to each of the phase shifters 414 and which may be used to configure the phase shifters 414 to provide a desired amount of phase shift or phase offset between antenna elements 420.

In the illustrated architecture 400, RF signals received by the antenna elements 420 are provided to one or more first amplifiers 456 to boost the signal strength. The first amplifiers 456 may be connected to the same antenna arrays 418 (e.g., for time division duplex (TDD) operations). The first amplifiers 456 may be connected to different antenna arrays 418. The boosted RF signal is input into one or more phase shifters 454 to provide a configurable phase shift or phase offset for the corresponding received RF signal to enable reception via one or more Rx beams. The phase shifter 454 may be an active phase shifter or a passive phase shifter. The settings of the phase shifters 454 are independent, meaning that each can be independently set to provide a desired amount of phase shift or the same amount of phase shift or some other configuration. The modem 402 and/or the controller/processor 434 may have at least one control line connected to each of the phase shifters 454 and which may be used to configure the phase shifters 454 to provide a desired amount of phase shift or phase offset between antenna elements 420 to enable reception via one or more Rx beams.

The outputs of the phase shifters 454 may be input to one or more second amplifiers 452 for signal amplification of the phase shifted received RF signals. The second amplifiers 452 may be individually configured to provide a configured amount of gain. The second amplifiers 452 may be individually configured to provide an amount of gain to ensure that the signals input to combiner 450 have the same magnitude. The amplifiers 452 and/or 456 are illustrated in dashed lines because they might not be necessary in some aspects. In some aspects, both the amplifier 452 and the amplifier 456 are present. In another aspect, neither the amplifier 452 nor the amplifier 456 are present. In other aspects, one of the amplifiers 452, 456 is present but not the other.

In the illustrated architecture 400, signals output by the phase shifters 454 (via the amplifiers 452 when present) are combined in combiner 450. The combiner 450 in architecture 400 combines the RF signal into a signal. The combiner 450 may be a passive combiner (e.g., not connected to a power source), which may result in some insertion loss. The combiner 450 may be an active combiner (e.g., connected to a power source), which may result in some signal gain. When combiner 450 is an active combiner, it may provide a different (e.g., configurable) amount of gain for each input signal so that the input signals have the same magnitude when they are combined. When combiner 450 is an active combiner, the combiner 450 may not need the second amplifier 452 because the active combiner may provide the signal amplification.

The output of the combiner 450 is input into mixers 448 and 446. Mixers 448 and 446 generally down convert the received RF signal using inputs from local oscillators 472 and 470, respectively, to create intermediate or baseband signals that carry the encoded and modulated information. The output of the mixers 448 and 446 are input into an analog-to-digital converter (ADC) 444 for conversion to digital signals. The digital signals output from ADC 444 are input to modem 402 for baseband processing, such as decoding, de-interleaving, or similar operations.

The architecture 400 is given by way of example only to illustrate an architecture for transmitting and/or receiving signals. In some cases, the architecture 400 and/or each portion of the architecture 400 may be repeated multiple times within an architecture to accommodate or provide an arbitrary number of RF chains, antenna elements, and/or antenna panels. Furthermore, numerous alternate architectures are possible and contemplated. For example, although only a single antenna array 418 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 422, 424, 426, 428) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 410, amplifiers 412, 416, or phase shifters 414 may be located between the DAC 404 and the first mixer 406 or between the first mixer 406 and the second mixer 408. In one example, the functions of one or more of the components may be combined into one component. For example, the phase shifters 414 may perform amplification to include or replace the first and/or or second amplifiers 412, 416. By way of another example, a phase shift may be implemented by the second mixer 408 to obviate the need for a separate phase shifter 414. This technique is sometimes called local oscillator (LO) phase shifting. In some aspects of this configuration, there may be multiple IF to RF mixers (e.g., for each antenna element chain) within the second mixer 408, and the local oscillator B 432 may supply different local oscillator signals (with different phase offsets) to each IF to RF mixer.

The modem 402 and/or the controller/processor 434 may control one or more of the other components 404 through 472 to select one or more antenna elements 420 and/or to form beams for transmission of one or more signals. For example, the antenna elements 420 may be individually selected or deselected for transmission of a signal (or signals) by controlling an amplitude of one or more corresponding amplifiers, such as the first amplifiers 412 and/or the second amplifiers 416. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 420, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 418) can be dynamically controlled by modifying the phase shifts or phase offsets imparted by the phase shifters 414 and amplitudes imparted by the amplifiers 412, 416 of the multiple signals relative to each other. The controller/processor 434 may be located partially or fully within one or more other components of the architecture 400. For example, the controller/processor 434 may be located within the modem 402 in some aspects.

AAS modeling for FR2 involves analog beamforming over a planar array. An AAS is a system that combines an antenna array with an active transceiver unit array. A transceiver unit is the active unit consisting of transmitter and/or receiver that transmits and/or receives radio signals. An antenna may include several identical radiating elements located in a planar array configuration with fixed separation distances. An antenna array is a group of antenna elements characterized by the geometry and the properties of the array elements. The geometry of the array elements can be either linear or non-linear to meet the system requirements. An array element is a subdivision of a passive antenna array that includes a single radiating element or a group of radiating elements, with a fixed radiation pattern. Gain (in a given direction) is the ratio of the radiation intensity, in a given direction, to the radiation intensity that would be obtained if the power accepted by the antenna were radiated isotropically.

AAS modeling may also be considered for FR3, FR4, FR5, and other frequency ranges. An alternative subarray/panel-based AAS design has been considered for FR1, but not for FR2. However, this alternative AAS design is expected to lead to considerable design complexities.

As indicated above, FIG. 4 is provided as an example. Other examples may differ from what is described with regard to FIG. 4.

Figure 5:
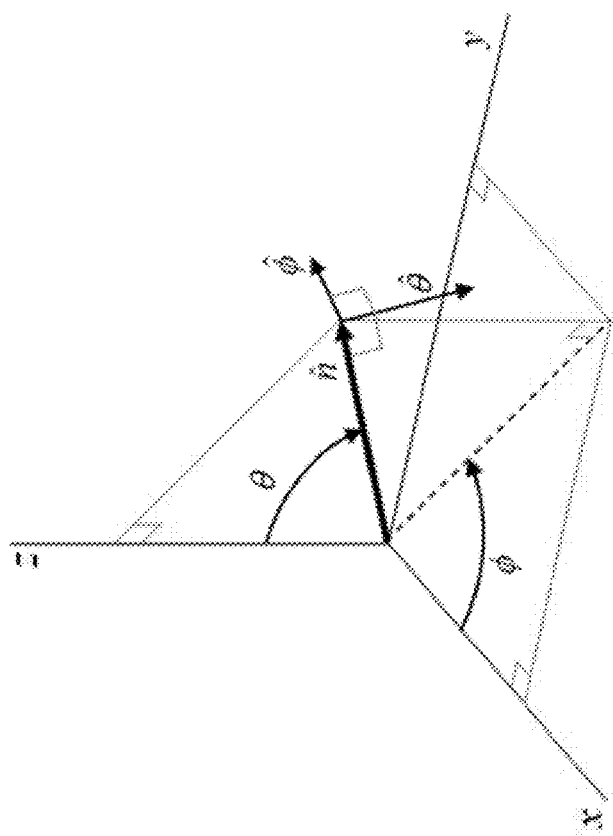
FIG. 5 is a diagram illustrating an example of a global coordinate system, in accordance with the present disclosure.

FIG. 5 is a diagram illustrating an example 500 of a global coordinate system, (GCS) in accordance with the present disclosure.

Figure 7:
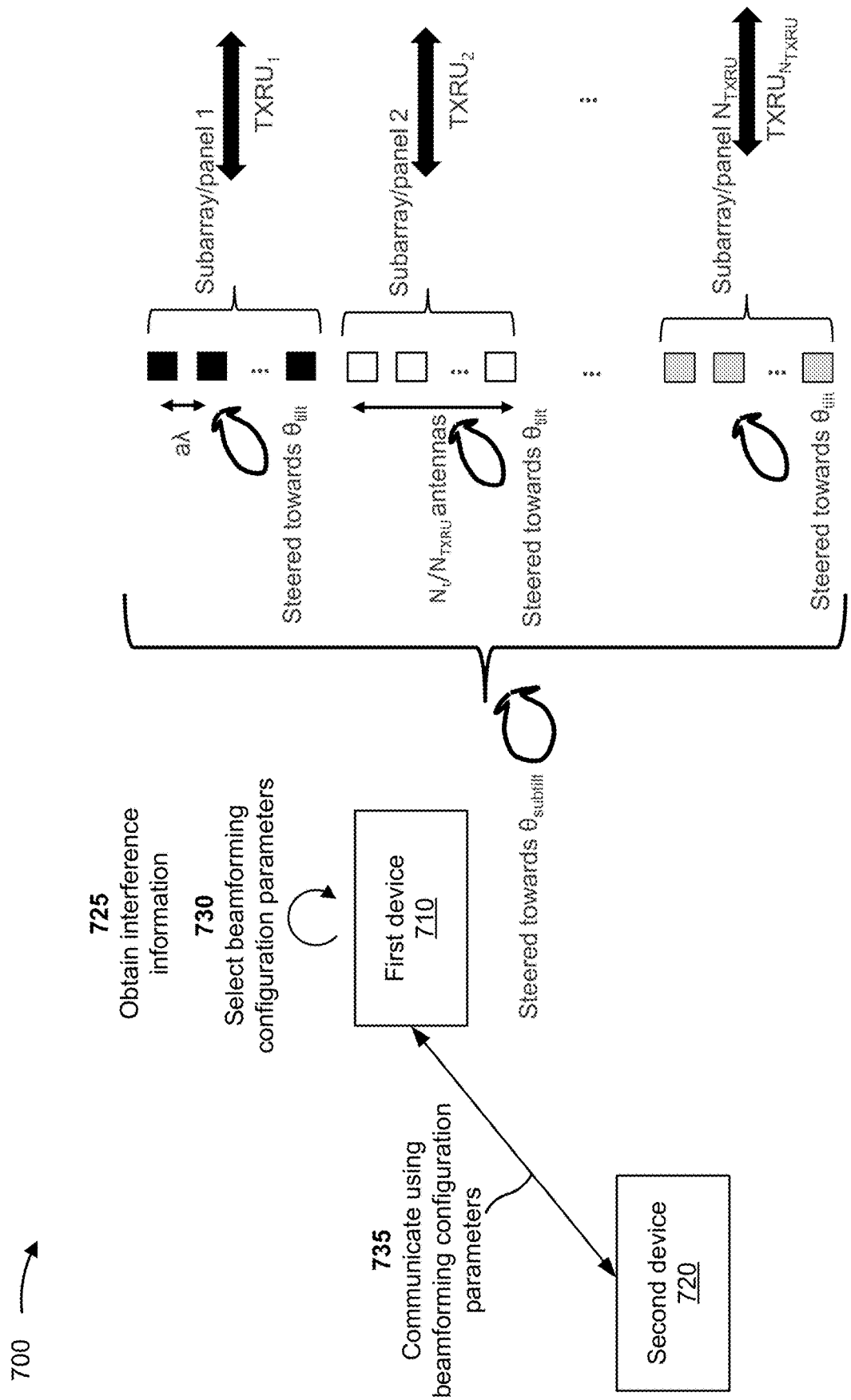
FIG. 7 is a diagram illustrating an example of selecting configuration parameters for a multi-panel active antenna system (AAS), in accordance with the present disclosure.

Example 500 shows a global coordinate system that is defined by the x, y, z axes, the spherical angles and the spherical unit vectors (also see FIG. 7.1.1 of 3GPP Technical Report (TR) 38.901). Example 500 defines the zenith (elevation) angle $\theta$ and the azimuth angle $\phi$ in a Cartesian coordinate system. Zenith angle $\theta$ of the signal direction (defined between 0° and 180°, 90° represents perpendicular to array). Note that $\theta=0°$ points to the zenith and $\theta=90°$ points to the horizon. The azimuth angle φ (defined between −180° and 180°). The field component in the direction of $\hat{\theta}$ is given by $F_\theta$ and the field component in the direction of $\hat{\phi}$ is given by $F_\phi$. The vector $\hat{n}$ is the given direction. $\hat{\theta}$ and $\hat{\phi}$ are the spherical basis vectors.

As indicated above, FIG. 5 is provided as an example. Other examples may differ from what is described with regard to FIG. 5.

Figure 6:
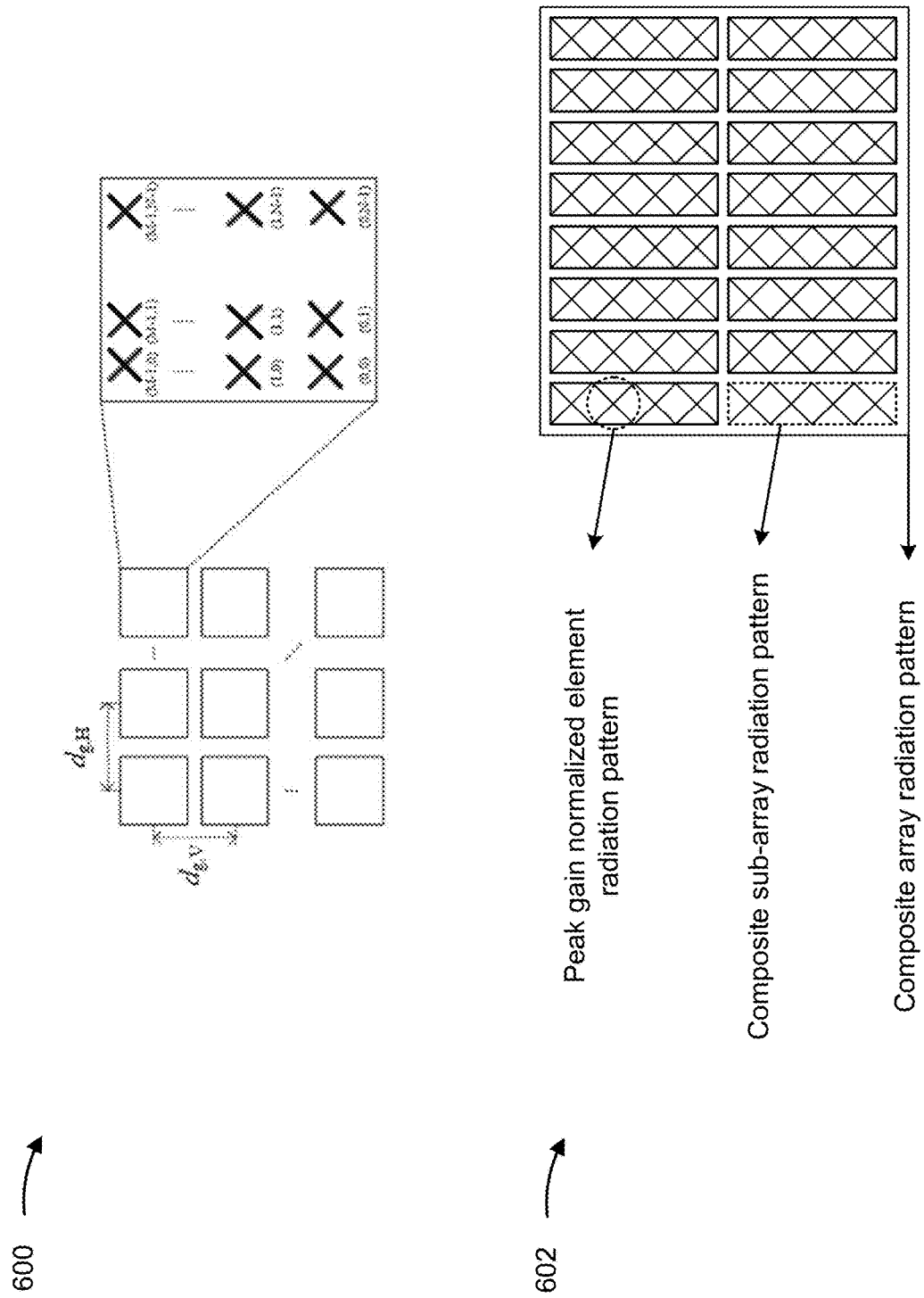
FIG. 6 is a diagram illustrating examples of panel arrays, in accordance with the present disclosure.

FIG. 6 is a diagram illustrating examples 600 and 602 of panel arrays, in accordance with the present disclosure.

Example 600 shows a cross-polarized panel array antenna model (also see TR 38.901 FIG. 7.3-1). The antenna is modeled by a uniform rectangular panel array, comprising $M_g N_g$ panels, with $M_g$ being the number of panels in a column and $N_g$ being the number of panels in a row. The panels may have various properties. For example, antenna panels may be uniformly spaced in the horizontal direction with a spacing of $d_{g,H}$ and may be uniformly spaced in the vertical direction with a spacing of $d_{g,V}$. On each antenna panel, antenna elements are placed in the vertical and horizontal direction, where N is the number of columns, M is the number of antenna elements with the same polarization in each column. Antenna numbering on the panel illustrated by example 600 assumes observation of the antenna array from the front (with x-axis pointing towards broadside/boresight and increasing y-coordinate for increasing column number). The antenna elements are uniformly spaced in the horizontal direction with a spacing of $d_H$ and in the vertical direction with a spacing of $d_V$. The antenna panel is either single polarized (P=1) or dual polarized (P=2). The rectangular panel array antenna can be described by the following tuple $(M_g, N_g, M, N, P)$.

Base station antennas may be modeled for an urban macro scenario. For example, an antenna element vertical radiation pattern (in dB) may be represented by $$A_{E,V}(\theta) = -\min\left[12\left(\frac{\theta - 90}{\theta_{3dB}}\right)^2, SLA_v\right],$$

where $\theta_{3\,dB}=65°$ and a successive linear approximation $SLA_v=30$ dB. An antenna element horizontal radiation pattern (in dB) may be represented by $$A_{E,H}(\varphi) = -\min\left[12\left(\frac{\varphi}{\varphi_{3dB}}\right)^2, A_m\right],$$

where $\theta_{3\,dB}=65°$ and $A_m=30$ dB. The combining method for a 3D antenna element pattern (in dB) may be $A_{E,H}(\theta'', \varphi'')=-\min\{-[A_{E,V}(\theta'')+A_{E,H}(\varphi'')], A_m\}$. The maximum directional gain of an antenna element $G_{E,max}$ may be 8 dBi. The tuple $(M_g, N_g, M, N, P)$ for 30 GHz may be (1, 1, 8, 16, 2), and antenna spacings $d_v$, $d_h$ may be (0.5λ, 0.5λ).

A radiation pattern is the angular distribution of the radiated electromagnetic field or power level in the far field region. The composite array radiation pattern in dB $A_A(\theta, \varphi)$ for multiple columns ($N_V \times N_H$ elements) can be shown for beam i to be:

$$A_{A,Beami}(\theta, \phi) = A_E(\theta, \phi) + 10\log_{10}\left[1 + \rho \cdot \left(\left|\sum_{m=1}^{N_H}\sum_{n=1}^{N_V} w_{i,n,m} \cdot v_{n,m}\right|^2\right)\right].$$

The superposition vector is given by $$v_{n,m} = \exp\left(i \cdot 2\pi\left((n-1) \cdot \frac{d_V}{\lambda} \cdot \cos(\theta) + (m-1) \cdot \frac{d_H}{\lambda} \cdot \sin(\theta) \cdot \sin(\varphi)\right)\right),$$

where $m=1, 2, \ldots N_H$; $n=1, 2, \ldots N_V$, and the beam weights are given by:

$$w_{m,n} = \frac{1}{\sqrt{N_H N_V}} \exp\left(i \cdot 2\pi\left((n-1) \cdot \frac{d_V}{\lambda} \cdot \sin(\theta_{i,etilt}) - (m-1) \cdot \frac{d_H}{\lambda} \cdot \cos(\theta_{i,etilt}) \cdot \sin(\varphi_{i,escan})\right)\right).$$

The total antenna gain is the sum of the element gain ($A_E(\theta, \phi)$) and the array (analog beamforming) gain ($10 \log_{10}[1+\rho \cdot (|\sum_{m=1}^{N_H}\sum_{n=1}^{N_V} w_{i,n,m} v_{n,m}|^2)]$.)

Example 602 shows multiple antenna subarrays of a single panel. The subarrays may be modeled (fine-granularity step) according to some aspects of the present disclosure. $N_{sub}$ may be a number of elements in a subarray, $d_{v,sub}$ may be a number of elements in a vertical subarray separation, and $\theta_{subtilt}$ may be an electrical subarray down-tilt angle, which is the angle between the direction of the maximum antenna gain and the horizontal plane.

A peak normalized element radiation pattern for the panel in example 602 may be represented by $$A_e(\theta, \phi) = -\min\left[-\left(-\min\left[12\left(\frac{\theta'' - 90}{\theta_{3dB}}\right)^2, SLA_v\right] - \min\left[12\left(\frac{\varphi''}{\phi_{3dB}}\right)^2, A_m\right]\right), A_m\right].$$

A peak gain normalized element radiation pattern may be represented by $A_E(\theta, \phi) = G_{E,max} + A_e(\theta, \phi)$. A composite subarray radiation pattern may be represented by $$A_{sub}(\theta, \phi) = A_E(\theta, \phi) + 10\log_{10}\left(\left|\sum_{l=1}^{N_{sub}} s_l q_l\right|^2\right),$$

where $s_l = \frac{1}{\sqrt{N_{sub}}}\exp\left(j2\pi(l-1)\frac{d_{v,sub}}{\lambda}\sin(\theta_{subtilt})\right) \rightarrow$ subarray excitation, and $q_l = \exp\left(j2\pi(l-1)\frac{d_{v,sub}}{\lambda}(\cos(\theta))\right).$ A composite array radiation pattern may be represented by $$A_A(\theta, \phi) = A_{sub}(\theta, \phi) + 10\log_{10}\left(\left|\sum_{m=1}^{M}\sum_{n=1}^{N} w_{m,n} v_{n,m}\right|^2\right),$$

where $w_{m,n} =$ $$\frac{1}{\sqrt{MN}}\exp\left(j2\pi\left((m-1)\frac{d_v}{\lambda}\sin(\theta_{target}) - (n-1)\frac{d_h}{\lambda}\cos(\theta_{target})\sin(\phi_{target})\right)\right),$$

and $$v_{m,n} = \exp\left(j2\pi\left((m-1)\frac{d_v}{\lambda}\cos(\theta) + (n-1)\frac{d_h}{\lambda}\sin(\theta)\sin(\phi)\right)\right).$$

As indicated above, FIG. 6 is provided as an example. Other examples may differ from what is described with regard to FIG. 6.

FIG. 7 is a diagram illustrating an example 700 of selecting beamforming configuration parameters for a multi-panel AAS, in accordance with the present disclosure.

Example 700 shows a wireless device, such as a first device 710 (e.g., a UE 120, network entity) that may communicate with a second device 720 (e.g., a UE 120, network entity). The multi-panel AAS may have up to $N_{TXRU}$ panels that are each controlled by a transceiver unit (TXRU).

The first device 710 may include and/or be configured to control a multi-panel AAS, such as described in connection with FIGS. 4-6. However, there are inefficiencies that may be due to deployment constraints. For example, the panels in a multi-panel AAS may all have the same steering tilt angle $\theta_{tilt}$, which may be the same as the steering subtilt angle $\theta_{subtilt}$ across the panels for the whole AAS. There may also be interference affecting some panels. This means that some panels may have efficient beams towards targets and other panels may not have efficient beams towards targets. This may cause degraded communications that waste power, system efficiencies, and signaling resources.

According to various aspects described herein, a wireless device that operates a multi-panel AAS may obtain interference information and, based at least in part on the interference information, select beamforming configuration parameters to optimize the beamforming performance of the multi-panel AAS. The beamforming configuration parameters may include a quantity of one or more transceiver units that are each associated with a panel of the AAS, a steering tilt angle to use for each panel controlled by a transceiver unit, and a steering subtilt angle for use across the panels. The beamforming configuration parameters may include a total quantity of antenna elements used in elevation and/or azimuth domain and/or a quantity of elements within a subarray/panel. The beamforming configuration parameters may include beam weights (e.g., for phase shifters and/or amplitude control settings) of the antenna elements in the multi-panel AAS (e.g., all antenna elements in the multi-panel AAS).

The wireless device may select the beamforming configuration parameters based at least in part on an inter-antenna element spacing within a panel and/or a quantity of antennas within a panel of the multi-panel. The wireless device may, for example, select the steering subtilt angle to be different than the steering tilt angle to be used for each panel. The wireless device may also select an inter-antenna element spacing and/or select beam weights of antenna elements in the multi-panel AAS. By selecting such beamforming configuration parameters, the wireless device may configure the multi-panel AAS to use more efficient beamforming performance towards target devices.

Example 700 shows an example of beamforming configuration parameter selection. As shown by reference number 725, a wireless device (e.g., first device 710) may obtain interference information. The interference information may include, among other examples, beam measurements from reference signals received at one or more devices, CSI reports, RSRP, and/or signal-to-noise ratio (SNR) reports. In some aspects, the second device 720 may measure beams from the first device 710 and transmit beam measurements as interference information to the first device 710. In this way, the first device 710 may obtain the interference information from the second device 720. The second device 720 may be a base station, a network entity, a UE, a customer premises equipment (CPE), a non-terrestrial device, or a network node. The first device 710 may be a network entity such as a disaggregated base station, where the first device 710 received interference information from a CU, a DU, an RU, a remote radio head (RRH) unit, or a UE. The first device 710 may also receive interference information from devices other than the second device 720. For example, the first device 710 may receive interference information from coexisting systems or from serviced UEs. Coexisting systems such as satellites can report interference from 5G/5G-Evolved services to a centralized database that can feed back interference information to optimize AAS configuration parameters. In some aspects, the first device 710 may obtain the interference information by measuring beams or reference signals from other devices, such as from the second device 720.

As shown by reference number 730, the first device 710 may select beamforming configuration parameters. The first device 710 may select the beamforming configuration parameters based at least in part on inter-antenna element spacing (e.g., $\alpha\lambda$) and/or a quantity of antennas within a panel ($N_T/N_{TXRU}$). The first device 710 may select a quantity of one or more transceiver units $N_{TXRU}$ that are each associated with a panel, a steering tilt angle $\theta_{tilt}$ to use for each panel controlled by a transceiver unit, and a steering subtilt angle $\theta_{tilt}$ for use across the panels. In some aspects, the first device 710 may select a steering tilt angle $\theta_{tilt}$ for panels that is different than a steering subtilt angle $\theta_{subtilt}$ that is to be used across the panels. For example, for 16 antennas in a panel with 0.7$\lambda$ inter-antenna element spacing and with $N_{TXRU}$=1, 2, 4, or 8, the steering tilt angle $\theta_{tilt}$ may be 96° and the steering subtilt angle $\theta_{subtilt}$ may be 90°. In another example, for 8 antennas in a panel with 0.8$\lambda$ inter-antenna element spacing and with $N_{TXRU}$=1, 2, 4, or 8, the steering tilt angle $\theta_{tilt}$ may be 110° and the steering subtilt angle $\theta_{subtilt}$ may be 90°. In some aspects, the first device 710 may select a separate $\theta_{tilt}$ for each panel.

In some aspects, a CU, a DU, and/or a RU of a network entity may split beamforming configuration parameters of a transceiver unit and signal the beamforming configuration parameters between different components of the network entity.

By selecting beamforming configuration parameters that include a quantity of transceiver units, a steering tilt angle for each panel, and a steering subtilt angle across the panels, the first device 710 may provide more accurate beamforming performance toward targets and improve communications and the use of transmit power, processing resources, and signaling resources. This may help increase the efficiency and functionality of multi-panel AASs and AAS optimizations continue over FR2, FR3, FR4, and other frequency ranges.

As indicated above, FIG. 7 is provided as an example. Other examples may differ from what is described with respect to FIG. 7.

Figure 8:
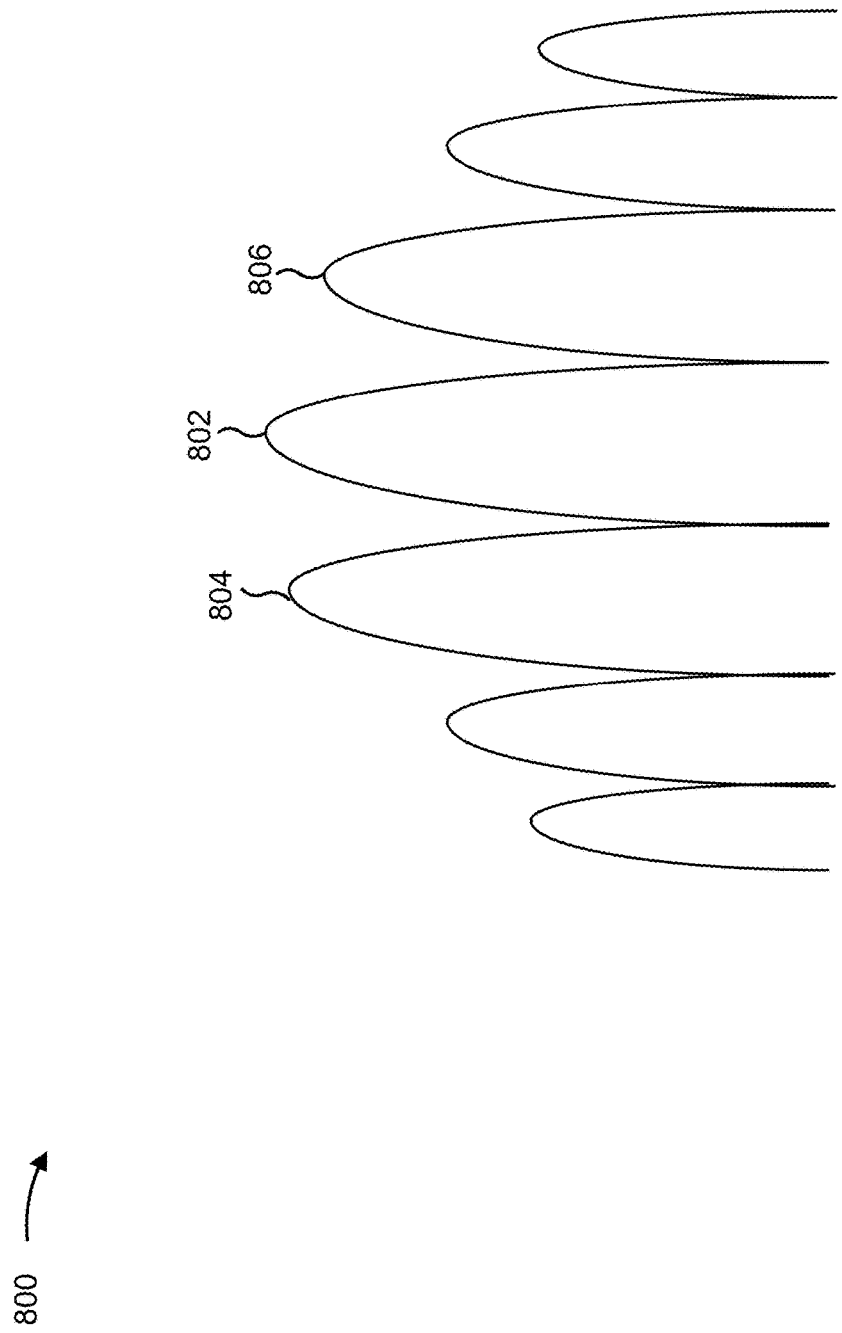
FIG. 8 is a diagram illustrating an example of a lobe distribution of a beam, in accordance with the present disclosure.

FIG. 8 is a diagram illustrating an example 800 of a lobe distribution of a beam, in accordance with the present disclosure.

Example 800 shows a beam with a distribution of lobes, including a main lobe 802, a first side lobe 804, and a second side lobe 806. While other side lobes are shown, some side lobes are not shown. In some aspects, the first device 710 may steer a beam and adjust a distribution of lobes based at least in part on selecting the steering tilt angle $\theta_{tilt}$ for each panel, the steering subtilt angle $\theta_{subtilt}$, and the quantity of transceiver units. With fewer transceiver units, the main lobe 802 of the beam may be steered closer to the steering tilt angle $\theta_{tilt}$. With a greater quantity of transceiver units, the main lobe 802 of the beam may be steered closer to the steering subtilt angle $\theta_{subtilt}$.

Some configurations (e.g., $N_{TXRU}$=4 with $N_T$=8 scenario) may have more interfering side lobes than other configurations. These configurations can be problematic if there are coexisting systems and interference is an issue. The first device 710 may select beamforming configuration parameters to account for different deployments, different target device distributions, and different interference issues. For example, if there is a single target device or target devices are in close proximity to each other. The first device 710 may select beamforming configuration parameters to strengthen a main lobe 802, adjust a distance between the main lobe 802 and the side lobes 804 and 806, and/or increase a gain difference between the main lobe 802 and the side lobes 804 and 806. If the target devices are more spread out, the first device 710 may select beamforming configuration parameters to provide more gain to the side lobes 804 and 806.

In some aspects, the first device 710 may select beamforming configuration parameters based at least in part on a target direction of the main lobe of a generated beam, a target quantity of relevant side lobes of the generated beam, and/or a target difference between a gain of the main lobe of the generated beam and a gain of at least one side lobe of the generated beam. The first device 710 may select beamforming configuration parameters based at least in part on one or more of a target distribution of the main and side lobes of a generated beam or target gain levels of the main and side lobes of the generated beam. As shown by reference number 735, the first device 710 may communicate using the selected beamforming configuration parameters. By selecting beamforming configuration parameters to adjust the distribution of the lobes, the first device 710 may achieve more of a beamforming gain for target devices, which improves communications.

As indicated above, FIG. 8 is provided as an example. Other examples may differ from what is described with regard to FIG. 8.

Figure 9:
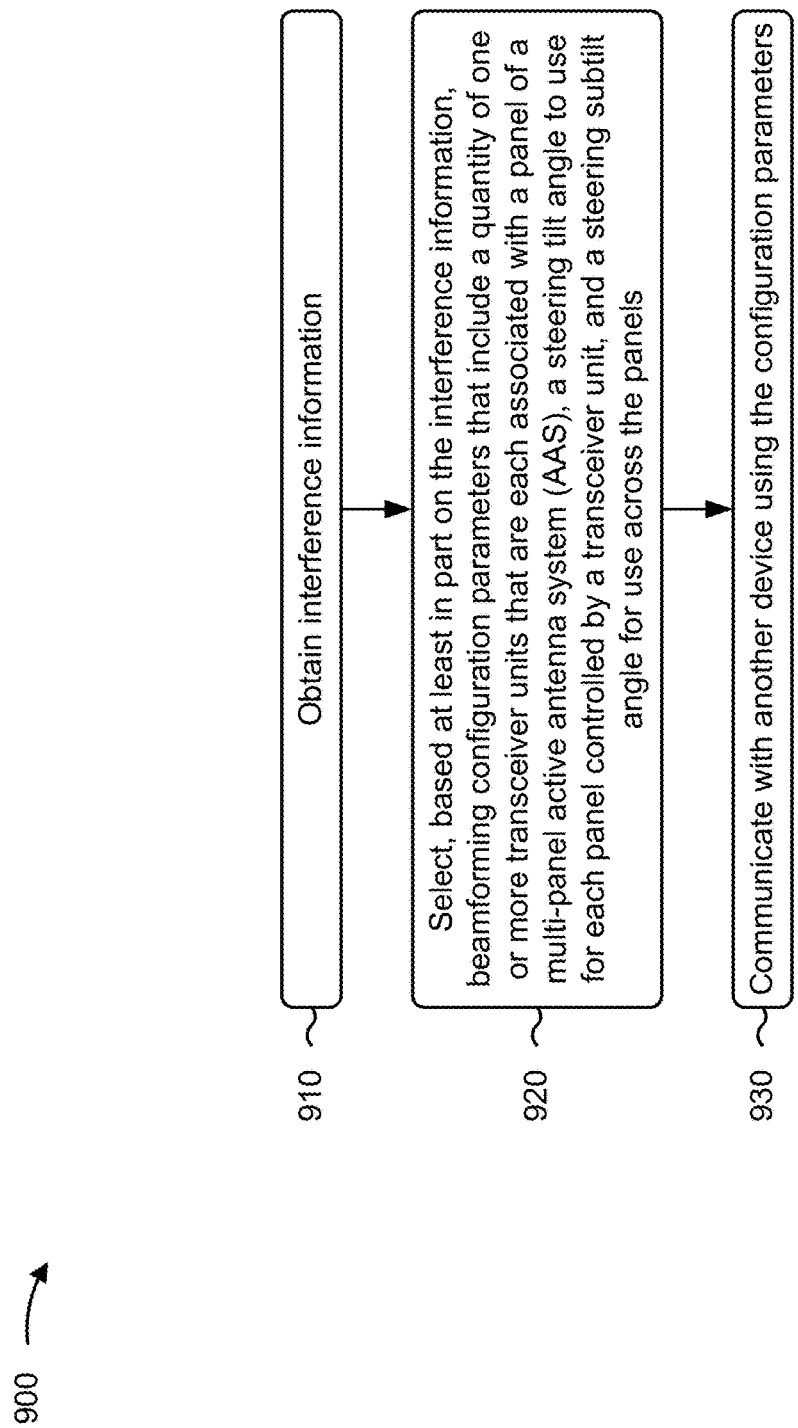
FIG. 9 is a diagram illustrating an example process performed, for example, by a wireless device, in accordance with the present disclosure.

FIG. 9 is a diagram illustrating an example process 900 performed, for example, by a wireless device, in accordance with the present disclosure. Example process 900 is an example where the wireless device (e.g., first device 710) performs operations associated with selecting beamforming configuration parameters for a multi-panel AAS.

As shown in FIG. 9, in some aspects, process 900 may include obtaining interference information (block 910). For example, the wireless device (e.g., using communication manager 1008 and/or interference information component 1010 depicted in FIG. 10) may obtain interference information, as described above.

As further shown in FIG. 9, in some aspects, process 900 may include selecting, based at least in part on the interference information, beamforming configuration parameters that include: a quantity of one or more transceiver units that are each associated with a panel of a multi-panel AAS, a steering tilt angle to use for each panel controlled by a transceiver unit, and a steering subtilt angle for use across the panels (block 920). For example, the wireless device (e.g., using communication manager 1008 and/or beamforming component 1012 depicted in FIG. 10) may select, based at least in part on the interference information, beamforming configuration parameters that include: a quantity of one or more transceiver units that are each associated with a panel of a multi-panel AAS, a steering tilt angle to use for each panel controlled by a transceiver unit, and a steering subtilt angle for use across the panels, as described above.

As further shown in FIG. 9, in some aspects, process 900 may include communicating with another device using the beamforming configuration parameters (block 930). For example, the wireless device (e.g., using communication manager 1008, transmission component 1004, and/or reception component 1002 depicted in FIG. 10) may communicate with another device using the beamforming configuration parameters, as described above.

Process 900 may include additional aspects, such as any single aspect or any combination of aspects described below and/or in connection with one or more other processes described elsewhere herein.

In a first aspect, selecting the beamforming configuration parameters includes selecting the beamforming configuration parameters based at least in part on an inter-antenna element spacing within a panel.

In a second aspect, alone or in combination with the first aspect, selecting the beamforming configuration parameters includes selecting an inter-antenna element spacing.

In a third aspect, alone or in combination with one or more of the first and second aspects, selecting the beamforming configuration parameters includes selecting beam weights of antenna elements in the multi-panel AAS.

In a fourth aspect, alone or in combination with one or more of the first through third aspects, selecting the beamforming configuration parameters includes selecting the steering subtilt angle to be different than the steering tilt angle to be used for each panel.

In a fifth aspect, alone or in combination with one or more of the first through fourth aspects, selecting the beamforming configuration parameters includes selecting the beamforming configuration parameters based at least in part on a quantity of antennas within a panel of the multi-panel AAS.

In a sixth aspect, alone or in combination with one or more of the first through fifth aspects, obtaining the interference information includes receiving the interference information from one or more of a base station, a network entity, a UE, a CPE, a non-terrestrial device, or a network node, or measuring interference based at least in part on a signal from a base station, a network entity, a UE, a CPE, a non-terrestrial device, or a network node.

In a seventh aspect, alone or in combination with one or more of the first through sixth aspects, the wireless device is a network entity, and obtaining the interference information includes receiving the interference information from a CU, a DU, an RU, an RRH unit, or a UE.

In an eighth aspect, alone or in combination with one or more of the first through seventh aspects, the wireless device is a UE or an RRH unit.

In a ninth aspect, alone or in combination with one or more of the first through eighth aspects, selecting the beamforming configuration parameters includes selecting the beamforming configuration parameters based at least in part on a target direction of a main lobe of a generated beam.

In a tenth aspect, alone or in combination with one or more of the first through ninth aspects, selecting the beamforming configuration parameters includes selecting the beamforming configuration parameters based at least in part on a target quantity of relevant side lobes of a generated beam.

In an eleventh aspect, alone or in combination with one or more of the first through tenth aspects, selecting the beamforming configuration parameters includes selecting the beamforming configuration parameters based at least in part on a target difference between a gain of a main lobe of a generated beam and a gain of at least one side lobe of the generated beam.

In a twelfth aspect, alone or in combination with one or more of the first through eleventh aspects, selecting the beamforming configuration parameters includes selecting the beamforming configuration parameters based at least in part on one or more of a target distribution of the main and side lobes of a generated beam or target gain levels of the main and side lobes of the generated beam.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
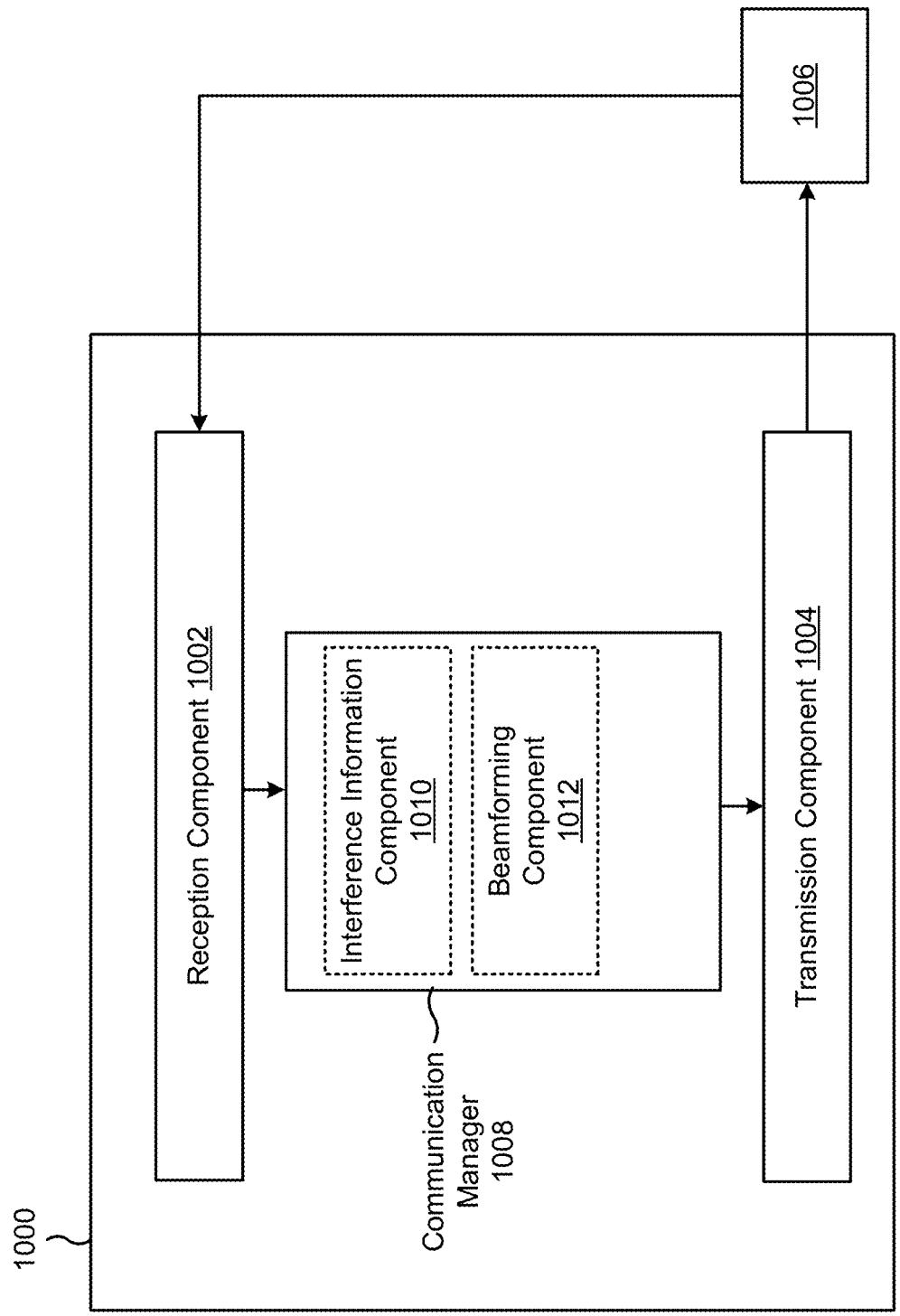
FIG. 10 is a diagram of an example apparatus for wireless communication, in accordance with the present disclosure.

FIG. 10 is a diagram of an example apparatus 1000 for wireless communication. The apparatus 1000 may be a wireless device (e.g., first device 710), or a first device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 1008. The communication manager 1008 may control and/or otherwise manage one or more operations of the reception component 1002 and/or the transmission component 1004. In some aspects, the communication manager 1008 may include one or more antennas, a modem, a controller/processor, a memory, or a combination thereof, of the UE 120 or the network entity described in connection with FIG. 2. The communication manager 1008 may be, or be similar to, the communication manager 140 or 150 depicted in FIGS. 1 and 2. For example, in some aspects, the communication manager 1008 may be configured to perform one or more of the functions described as being performed by the communication manager 140 or 150. In some aspects, the communication manager 1008 may include the reception component 1002 and/or the transmission component 1004. The communication manager 1008 may include an interference information component 1010 and/or a beamforming component 1012, among other examples.

In some aspects, the apparatus 1000 may be configured to perform one or more operations described herein in connection with FIGS. 1-8. Additionally, or alternatively, the apparatus 1000 may be configured to perform one or more processes described herein, such as process 900 of FIG. 9. In some aspects, the apparatus 1000 and/or one or more components shown in FIG. 10 may include one or more components of the first device described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the first device described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the first device described in connection with FIG. 2. In some aspects, the transmission component 1004 may be co-located with the reception component 1002 in a transceiver.

The interference information component 1010 may obtain interference information. The beamforming component 1012 may select, based at least in part on the interference information, beamforming configuration parameters that include a quantity of one or more transceiver units that are each associated with a panel of a multi-panel AAS, a steering tilt angle to use for each panel controlled by a transceiver unit, and a steering subtilt angle for use across the panels. The transmission component 1004 and the reception component 1002 may communicate with another device using the beamforming configuration parameters.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a wireless device, comprising: obtaining interference information; selecting, based at least in part on the interference information, beamforming configuration parameters that include: a quantity of one or more transceiver units that are each associated with a panel of a multi-panel active antenna system (AAS), a steering tilt angle to use for each panel controlled by a transceiver unit, and a steering subtilt angle for use across the panels; and communicating with another device using the beamforming configuration parameters.

Aspect 2: The method of Aspect 1, wherein selecting the beamforming configuration parameters includes selecting the beamforming configuration parameters based at least in part on an inter-antenna element spacing within a panel.

Aspect 3: The method of Aspect 1 or 2, wherein selecting the beamforming configuration parameters includes selecting an inter-antenna element spacing.

Aspect 4: The method of any of Aspects 1-3, wherein selecting the beamforming configuration parameters includes selecting beam weights of antenna elements in the multi-panel AAS.

Aspect 5: The method of any of Aspects 1-4, wherein selecting the beamforming configuration parameters includes selecting the steering subtilt angle to be different than the steering tilt angle to be used for each panel.

Aspect 6: The method of any of Aspects 1-5, wherein selecting the beamforming configuration parameters includes selecting the beamforming configuration parameters based at least in part on a quantity of antennas within a panel of the multi-panel AAS.

Aspect 7: The method of any of Aspects 1-6, wherein obtaining the interference information includes: receiving the interference information from one or more of a base station, a network entity, a user equipment, a customer premises equipment, a non-terrestrial device, or a network node; or measuring interference based at least in part on a signal from a base station, a network entity, a user equipment, a customer premises equipment, a non-terrestrial device, or a network node.

Aspect 8: The method of any of Aspects 1-6, wherein the wireless device is a network entity, and wherein obtaining the interference information includes: receiving the interference information from a central unit, a distributed unit, a radio unit, a remote radio head (RRH) unit, or a user equipment.

Aspect 9: The method of any of Aspects 1-6, wherein the wireless device is a user equipment or a remote radio head (RRH) unit.

Aspect 10: The method of any of Aspects 1-9, wherein selecting the beamforming configuration parameters includes selecting the beamforming configuration parameters based at least in part on a target direction of a main lobe of a generated beam.

Aspect 11: The method of any of Aspects 1-10, wherein selecting the beamforming configuration parameters includes selecting the beamforming configuration parameters based at least in part on a target quantity of relevant side lobes of a generated beam.

Aspect 12: The method of any of Aspects 1-11, wherein selecting the beamforming configuration parameters includes selecting the beamforming configuration parameters based at least in part on a target difference between a gain of a main lobe of a generated beam and a gain of at least one side lobe of the generated beam.

Aspect 13: The method of any of Aspects 1-12, wherein selecting the beamforming configuration parameters includes selecting the beamforming configuration parameters based at least in part on one or more of a target distribution of the main and side lobes of a generated beam or target gain levels of the main and side lobes of the generated beam.

Aspect 14: An apparatus for wireless communication at a device, comprising a processor; memory coupled with the processor; and instructions stored in the memory and executable by the processor to cause the apparatus to perform the method of one or more of Aspects 1-13.

Aspect 15: A device for wireless communication, comprising a memory and one or more processors coupled to the memory, the one or more processors configured to perform the method of one or more of Aspects 1-13.

Aspect 16: An apparatus for wireless communication, comprising at least one means for performing the method of one or more of Aspects 1-13.

Aspect 17: A non-transitory computer-readable medium storing code for wireless communication, the code comprising instructions executable by a processor to perform the method of one or more of Aspects 1-13.

Aspect 18: A non-transitory computer-readable medium storing a set of instructions for wireless communication, the set of instructions comprising one or more instructions that, when executed by one or more processors of a device, cause the device to perform the method of one or more of Aspects 1-13.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a wireless device, comprising:
   obtaining interference information;
   selecting, based at least in part on the interference information, beamforming configuration parameters that include:
      a quantity of one or more transceiver units that are each associated with a panel of a multi-panel active antenna system (AAS),
      a steering tilt angle to use for each panel controlled by a transceiver unit, and
      a steering subtilt angle for use across the panels; and
   communicating with another device using the beamforming configuration parameters.

2. The method of claim 1, wherein selecting the beamforming configuration parameters includes selecting the beamforming configuration parameters based at least in part on an inter-antenna element spacing within a panel.

3. The method of claim 1, wherein selecting the beamforming configuration parameters includes selecting an inter-antenna element spacing.

4. The method of claim 1, wherein selecting the beamforming configuration parameters includes selecting beam weights of antenna elements in the multi-panel AAS.

5. The method of claim 1, wherein selecting the beamforming configuration parameters includes selecting the steering subtilt angle to be different than the steering tilt angle to be used for each panel.

6. The method of claim 1, wherein selecting the beamforming configuration parameters includes selecting the beamforming configuration parameters based at least in part on a quantity of antennas within a panel of the multi-panel AAS.

7. The method of claim 1, wherein obtaining the interference information includes:
   receiving the interference information from one or more of a base station, a network entity, a user equipment, a customer premises equipment, a non-terrestrial device, or a network node; or
   measuring interference based at least in part on a signal from a base station, a network entity, a user equipment, a customer premises equipment, a non-terrestrial device, or a network node.

8. The method of claim 1, wherein the wireless device is a network entity, and wherein obtaining the interference information includes:
   receiving the interference information from a central unit, a distributed unit, a radio unit, a remote radio head (RRH) unit, or a user equipment.

9. The method of claim 1, wherein the wireless device is a user equipment or a remote radio head (RRH) unit.

10. The method of claim 1, wherein selecting the beamforming configuration parameters includes selecting the beamforming configuration parameters based at least in part on a target direction of a main lobe of a generated beam.

11. The method of claim 1, wherein selecting the beamforming configuration parameters includes selecting the beamforming configuration parameters based at least in part on a target quantity of relevant side lobes of a generated beam.

12. The method of claim 1, wherein selecting the beamforming configuration parameters includes selecting the beamforming configuration parameters based at least in part on a target difference between a gain of a main lobe of a generated beam and a gain of at least one side lobe of the generated beam.

13. The method of claim 1, wherein selecting the beamforming configuration parameters includes selecting the beamforming configuration parameters based at least in part on one or more of a target distribution of the main and side lobes of a generated beam or target gain levels of the main and side lobes of the generated beam.

14. A wireless device for wireless communication, comprising:
   a memory; and
   one or more processors, coupled to the memory, configured to:
      receive interference information;
      select, based at least in part on the interference information, beamforming configuration parameters that include:
         a quantity of one or more transceiver units that are each associated with a panel of a multi-panel active antenna system (AAS),
         a steering tilt angle to use for each panel controlled by a transceiver unit, and
         a steering subtilt angle for use across the panels; and
      communicate with another device using the beamforming configuration parameters.

15. The wireless device of claim 14, wherein the one or more processors, to select the beamforming configuration parameters, are configured to select the beamforming configuration parameters based at least in part on an inter-antenna element spacing within a panel.

16. The wireless device of claim 14, wherein the one or more processors, to select the beamforming configuration parameters, are configured to select an inter-antenna element spacing.

17. The wireless device of claim 14, wherein the one or more processors, to select the beamforming configuration parameters, are configured to select beam weights of antenna elements in the multi-panel AAS.

18. The wireless device of claim 14, wherein the one or more processors, to select the beamforming configuration parameters, are configured to select the steering subtilt angle to be different than the steering tilt angle to be used for each panel.

19. The wireless device of claim 14, wherein the one or more processors, to select the beamforming configuration parameters, are configured to select the beamforming configuration parameters based at least in part on a quantity of antennas within a panel of the multi-panel AAS.

20. The wireless device of claim 14, wherein the one or more processors, to receive the interference information, are configured to receive the interference information from one or more of a base station, a network entity, a user equipment, a CPE, a non-terrestrial device, or a network node.

21. The wireless device of claim 14, wherein the wireless device is a network entity, and wherein the one or more processors, to receive the interference information, are configured to receive the interference information from a central unit, a distributed unit, a radio unit, a remote radio head (RRH) unit, or a user equipment.

22. The wireless device of claim 14, wherein the wireless device is a user equipment or a remote radio head (RRH) unit.

23. The wireless device of claim 14, wherein the one or more processors, to select the beamforming configuration parameters, are configured to select the beamforming configuration parameters based at least in part on a target direction of a main lobe of a generated beam.

24. The wireless device of claim 14, wherein the one or more processors, to select the beamforming configuration parameters, are configured to select the beamforming configuration parameters based at least in part on a target quantity of relevant side lobes of a generated beam.

25. The wireless device of claim 14, wherein the one or more processors, to select the beamforming configuration parameters, are configured to select the beamforming configuration parameters based at least in part on a target difference between a gain of a main lobe of a generated beam and a gain of at least one side lobe of the generated beam.

26. The wireless device of claim 14, wherein the one or more processors, to select the beamforming configuration parameters, are configured to select the beamforming configuration parameters based at least in part on one or more of a target distribution of the main and side lobes of a generated beam or target gain levels of the main and side lobes of the generated beam.

27. A non-transitory computer-readable medium storing a set of instructions for wireless communication, the set of instructions comprising:
　one or more instructions that, when executed by one or more processors of a wireless device, cause the wireless device to:
　　receive interference information;
　　select, based at least in part on the interference information, beamforming configuration parameters that include:
　　　a quantity of one or more transceiver units that are each associated with a panel of a multi-panel active antenna system (AAS),
　　　a steering tilt angle to use for each panel controlled by a transceiver unit, and
　　　a steering subtilt angle for use across the panels; and
　　communicate with another device using the beamforming configuration parameters.

28. The non-transitory computer-readable medium of claim 27, wherein the one or more instructions, that cause the wireless device to select the beamforming configuration parameters, cause the wireless device to select the beamforming configuration parameters further based at least in part on one or more of an inter-antenna element spacing within a panel, or beam weights of antenna elements in the multi-panel AAS.

29. An apparatus for wireless communication, comprising:
　means for receiving interference information;
　means for selecting, based at least in part on the interference information, beamforming configuration parameters that include:
　　a quantity of one or more transceiver units that are each associated with a panel of a multi-panel active antenna system (AAS),
　　a steering tilt angle to use for each panel controlled by a transceiver unit, and
　　a steering subtilt angle for use across the panels; and
　means for communicating with another device using the beamforming configuration parameters.

30. The apparatus of claim 29, wherein the means for selecting the beamforming configuration parameters includes means for selecting the beamforming configuration parameters based at least in part on one or more an inter-antenna element spacing within a panel, or beam weights of antenna elements in the multi-panel AAS.

* * * * *